(12) United States Patent
Esposito et al.

(10) Patent No.: US 9,708,023 B2
(45) Date of Patent: Jul. 18, 2017

(54) ACTUATION DEVICE FOR BRAKES AND/OR CLUTCHES, IN PARTICULAR FOR MOTORCYCLES

(71) Applicant: Freni Brembo S.p.A., Curno, Bergamo (IT)

(72) Inventors: Alessandro Esposito, Curno (IT); Roberto Lavezzi, Curno (IT); Mauro Reolon, Curno (IT); Mauro Ielasi, Curno (IT)

(73) Assignee: Freni Brembo S.p.A., Curno (IT)

( * ) Notice: Subject to any disclaimer, the term of this patent is extended or adjusted under 35 U.S.C. 154(b) by 82 days.

(21) Appl. No.: 14/418,489

(22) PCT Filed: Jul. 26, 2013

(86) PCT No.: PCT/IB2013/056140
§ 371 (c)(1),
(2) Date: Jan. 30, 2015

(87) PCT Pub. No.: WO2014/020508
PCT Pub. Date: Feb. 6, 2014

(65) Prior Publication Data
US 2015/0298757 A1 Oct. 22, 2015

(30) Foreign Application Priority Data
Jul. 31, 2012 (IT) .............................. PD2012A0235

(51) Int. Cl.
*G05G 1/04* (2006.01)
*B62K 11/14* (2006.01)
(Continued)

(52) U.S. Cl.
CPC .............. *B62K 11/14* (2013.01); *B60T 7/102* (2013.01); *B62L 3/023* (2013.01)

(58) Field of Classification Search
CPC . B62K 11/14; B60T 7/08; B60T 7/102; B62L 3/02; B62L 3/023; G05G 1/04; B62M 25/04
See application file for complete search history.

(56) References Cited

U.S. PATENT DOCUMENTS 3,733,922 A 5/1973 Tripp
8,061,667 B2 * 11/2011 Weiss ...................... B60T 7/102
248/229.13
(Continued)

FOREIGN PATENT DOCUMENTS

DE 85 22 018 U1 9/1985

*Primary Examiner* — Adam D Rogers
(74) *Attorney, Agent, or Firm* — Blank Rome LLP

(57) ABSTRACT

Actuation device for brakes and/or clutches, in particular for motorcycles, provided with a device body, an attachment portion for attachment of the device to the handlebar of an associable motorcycle, and a support and guide portion of an actuation element. The attachment portion comprises at least one attachment bracket, suitable for partially receiving the portion of handlebar used for the attachment of the actuation device, and a locking bracket attached to the attachment bracket on the side opposite the associable handlebar, so as to identify a seat suitable for locking a portion of handlebar in the middle. Advantageously, the device body is in polymer material and the locking bracket is at least partially in metal and extends in a single piece from a first to a second end, the first end facing the attachment portion and the second end facing the support and guide portion.

21 Claims, 5 Drawing Sheets

(51) Int. Cl.
 *B62L 3/02* (2006.01)
 *B60T 7/10* (2006.01)

(56) References Cited

U.S. PATENT DOCUMENTS

| | | | |
|---|---|---|---|
| 8,357,864 B2* | 1/2013 | Murasawa | B60K 20/06 200/61.88 |
| 8,528,445 B2* | 9/2013 | Hsu | B62K 23/06 188/299.1 |
| 8,800,830 B2* | 8/2014 | Hoshi | B62J 11/00 224/413 |
| 2006/0117901 A1 | 6/2006 | Owyang | |
| 2007/0040087 A1* | 2/2007 | Barron | B62H 3/12 248/309.1 |
| 2011/0192687 A1* | 8/2011 | Miles | B60T 11/165 188/344 |
| 2013/0105285 A1* | 5/2013 | Nakada | B62K 23/02 200/61.54 |
| 2015/0000267 A1* | 1/2015 | Ruopp | B62L 3/023 60/592 |
| 2015/0068355 A1* | 3/2015 | Hsu | B62K 23/06 74/502.2 |

\* cited by examiner

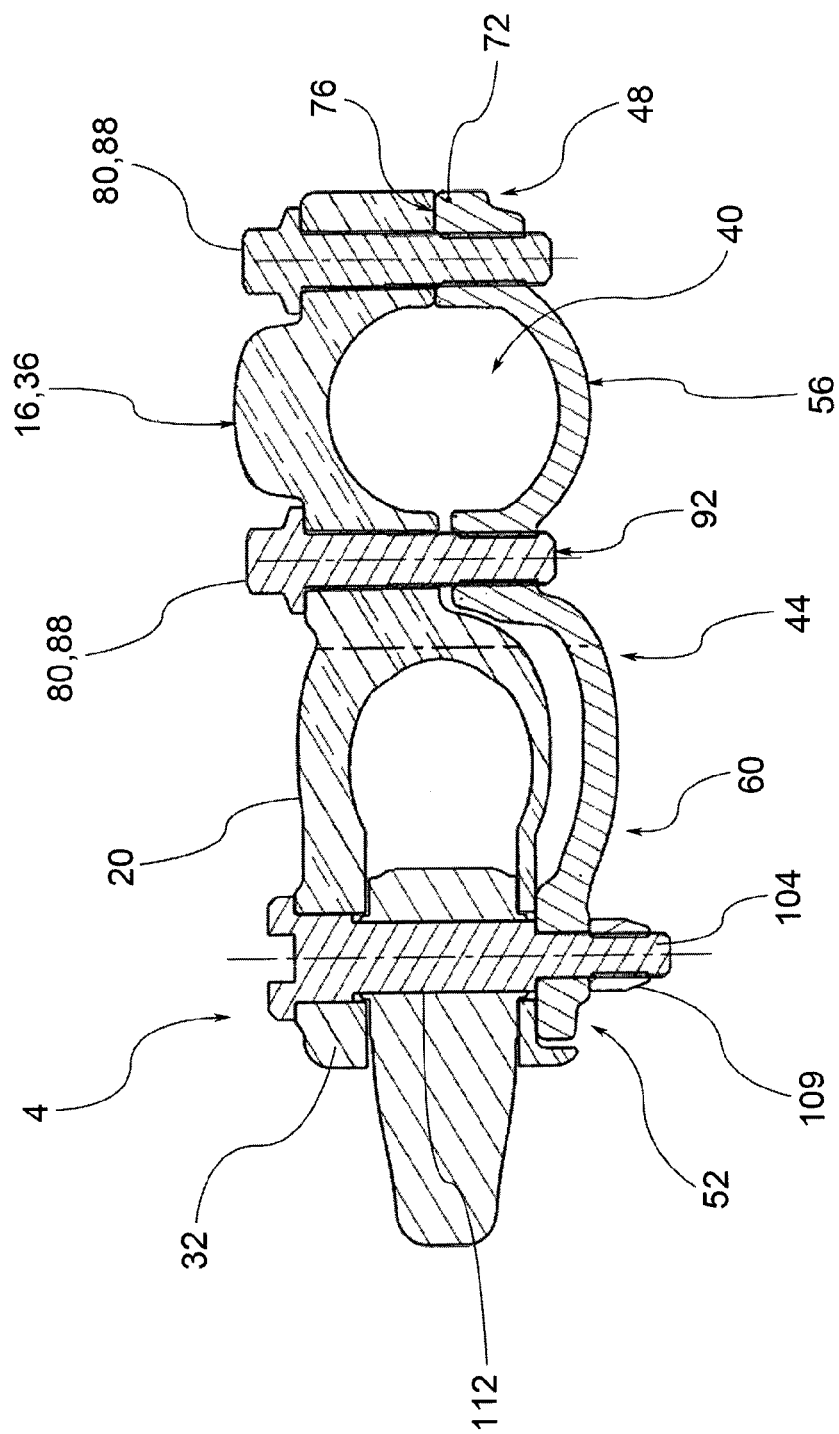

ACTUATION DEVICE FOR BRAKES AND/OR CLUTCHES, IN PARTICULAR FOR MOTORCYCLES

SPHERE OF APPLICATION

The present invention relates to an actuation device for brakes and/or clutches, in particular for motor cycles.

STATE OF THE ART

In particular, in the motor cycle sector, it is known of to make mechanical and/or hydraulic actuation devices to operate parts such as brakes or clutches. In particular, the actuation device comprises a hydraulic device and an actuation lever which, pulled manually by the user operates the brake or clutch. Such actuation may be of the mechanical and/or hydraulic type. For example, the mechanical type actuation provides for connection of a cable or tie-rod to the actuation lever; said cable or tie-rod is in turn operatively connected to the part to be actuated, such as for example the clutch or the brake. The hydraulic type operation provides for the use of pumps, which comprise a pump body, usually made of metal, provided with a reservoir of liquid, suitable to contain the liquid to supply to said pump.

The reservoir of liquid may be in one piece with the pump body or be separate from it.

The device body further comprises an attachment portion of the device to the handlebar of an associable motor cycle, as well as a support and guide portion of an actuation element, such as for example, the actuation lever.

The solutions of the prior art provide for making the device body mainly from metal. This way the device body is given a significant resistance, rigidity and resilience especially to withstand any mechanical stresses in the case of falling.

The choice of metal also ensures an appropriate mechanical resistance of the threaded connections which are used to constrain the attachment portion to the handlebar. Such attachment portion in fact comprises at least one bracket, partially counter-shaped to the handlebar so as to present a housing seat for partially receiving the portion of handlebar used for the attachment of the device. Said housing seat is in turn closed by the overlapping of a locking bracket which overlaps the handlebar, on the opposite side to the attachment bracket: the portion of handlebar is thus constrained in a bilateral constraint, between the attachment bracket and the locking bracket. The locking bracket is therefore attached to the attachment bracket by means of pins or screws which fit into threaded seats made in the attachment bracket made from metal.

PRESENTATION OF THE INVENTION

Consequently, as of today solutions of device bodies made mainly from metal have been provided for. While on the one side mechanical resistance is ensured, even in the case of the motor cycle falling over, on the other the solutions of the prior art are considerably heavy and expensive to produce.

The need is therefore felt to make available an actuation device for the brakes and clutches of motor cycles which has considerable mechanical resistance characteristics and which is at the same time lightweight and economical to produce.

Such need is resolved by an actuation device according to claim 1.

In particular, such need is resolved by an actuation device for brakes and/or clutches, in particular for motor cycles, provided with a device body, an attachment portion suitable for permitting the attachment of the device to the handlebar of an associable motor cycle, a support and guide portion of an actuation element of the actuation device, such as for example, an actuation lever, wherein the attachment portion comprises at least one attachment bracket, partially counter-shaped to an associable handlebar so as to present a housing seat suitable for partially housing the portion of handlebar used for the attachment of the actuation device. Moreover, the attachment portion comprises a locking bracket attached to the attachment bracket on the side opposite the associable handlebar, so as to identify a seat suitable for locking a portion of handlebar in the middle to block the actuation device. Advantageously, the device is characterised in that the locking bracket is at least partially made of metal and extends in a single piece from a first to a second end, wherein the first end is facing the attachment portion and the second end is facing the support and guide portion, so as to intercept and connect further to each other the attachment portion and the support and guide portion.

According to one embodiment, the device body is in polymer material.

According to one embodiment, the actuation device is a mechanical type actuation device wherein the actuation element is operatively connected to the device to be actuated, such as a brake or a clutch, by means of a cable, tie-rod and/or a transmission.

According to one embodiment, the actuation device is a hydraulic type actuation device comprising at least one reservoir of liquid to feed a pump, wherein said pump is operatively connected to the device to be actuated, such as a brake or a clutch.

According to one embodiment, the device body is in one piece with the reservoir of liquid.

According to a possible embodiment, the locking bracket has an overall double cradle configuration comprising a first cradle having a semi-circular shape to house the handlebar at least partially and a second cradle suitable for interfacing with said support and guide portion, the first cradle being adjacent to the first end and the second cradle being adjacent to the second end. The double cradle configuration permits both an aesthetic and mechanical adaptation of the locking bracket to the conformation of the handlebar and of the device body.

According to a further embodiment, at least one of said cradles comprises longitudinal reinforcement ribs, directed parallel to a main extension direction S-S of the locking bracket itself. Such ribs ensure considerable structural rigidity of the locking bracket.

According to a further embodiment, the reinforcement ribs are separated from each other by windows or hollows passing through the locking bracket. The hollows enable a reduction of the weight of the locking bracket without by so doing prejudicing its mechanical resistance.

According to a further embodiment, the cradles are adjacent to each other so as to identify a stop portion, intermediate between the first and second end, positioned in abutment against a corresponding flattening made on the device body, between the support and guide portion and the attachment portion. Such stop portion forms an abutment in the assembly of the locking bracket and facilitates the attachment operations both of the actuation element and of the portion of handlebar.

According to a further embodiment, the locking bracket is attached to the attachment portion and to the guide and support portion by means of the insertion of threaded connection means.

According to a further embodiment, the threaded connection means are screwed inside threaded seats made in the locking bracket. The creation of the threaded seats in the locking bracket is advantageous in that such seats are made in a metal portion and therefore more resistant.

According to a further embodiment, the threaded connection means comprise at least two attachment pins or screws respectively inserted at the first end of the locking bracket and at an intermediate portion of the locking bracket, between the first and second end.

The attachment of the locking bracket at opposite ends and also at an intermediate portion ensures a secure fastening and contributes significantly to stiffening the device body.

According to a further embodiment, the threaded connection means comprise a guide pin which connects the guide and support portion, the actuation element of the pump and the second end of the locking bracket to each other. Thanks to the fact that the guide pin connects the guide and support portion, the actuation element of the pump and the second end of the locking bracket considerable stiffening is achieved at the guide and support portion which in the case of a fall is particularly mechanically stressed.

According to a further embodiment, the guide pin, on the side opposite a tightening head, comprises a threaded portion screwed into a seat made in the second end of the locking bracket, the threaded portion being delimited by a shoulder. The shoulder mechanically separates the attachment function of the actuation lever and of the second end of the locking bracket from the guide function of said actuation lever.

According to a further embodiment, the guide pin, on the side opposite a tightening head, comprises a threaded portion passing through a seat made in the second end of the locking bracket; and a nut is further provided screwed onto the threaded portion so as to abut against the second end and constrain the locking bracket to the guide pin.

According to a further embodiment, the guide pin, between the threaded portion and the tightening head, comprises a cylindrical collar which receives and guides an eyelet of the actuation lever.

According to a further embodiment, the guide and support portion comprises a fork-shaped portion having a pair of prongs opposite and separate from each other so as to rotatably house and guide the actuation lever and wherein, the locking bracket, at its second end, at least partially overlaps one of said prongs so as to increase the overall thickness thereof.

According to a further embodiment, the locking bracket comprises an appendix for the attachment of accessories, said appendix overhanging the first end and being fitted with relative attachment means for said accessories.

According to a further embodiment, the locking bracket is substantially rectilinear.

According to a further embodiment, the locking bracket is a curved shape which identifies two branches angled to each other.

According to a further embodiment, the locking bracket comprises a metal core at least partially coated in polymer material. The metal core provides mechanical resistance, while the coating may have aesthetic or technical functions given that burrs or imperfections of the core can be encompassed. Such imperfections on the one hand would have a negative aesthetic impact and on the other could cause danger to the user in the case of collision/falling.

DESCRIPTION OF THE DRAWINGS

Further characteristics and advantages of the present invention will be more clearly comprehensible from the description given below of its preferred and non-limiting embodiments, wherein:

FIGS. 6*b* and 6*c* shows cross-section views of two embodiment variants of the device in FIG. 4.

The elements, or parts of elements common to the embodiments described below will be indicated using the same reference numerals.

DETAILED DESCRIPTION

Figure 1:
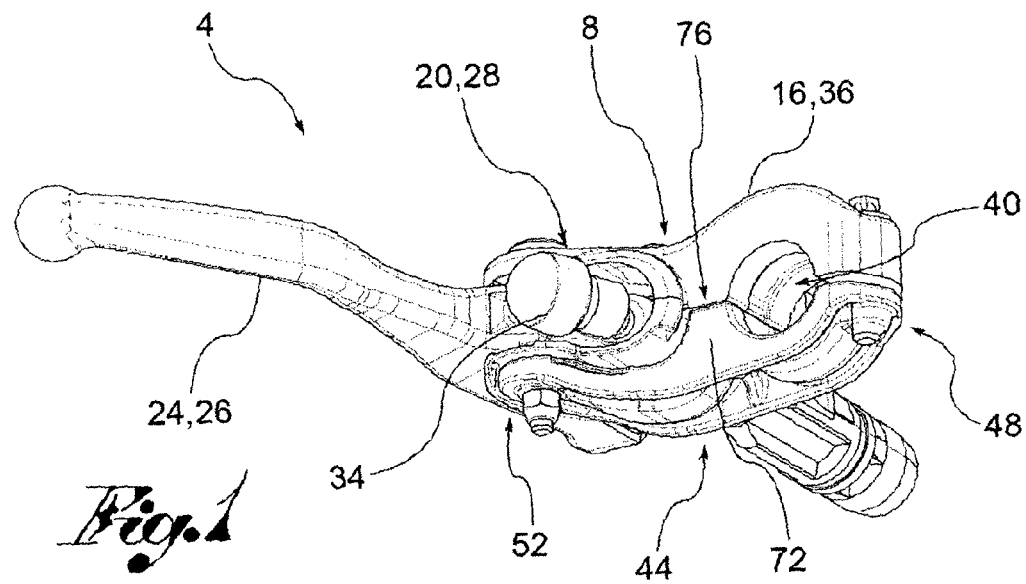
FIG. 1 shows a perspective view, in an assembled configuration, of an actuation device according to one embodiment of the present invention.

With reference to the aforesaid figures, reference numeral 4 globally denotes an actuation device for brakes and/or clutches, in particular for motor cycles in general. Typically this is a lever-operated actuation device positioned on the handlebar of the motor cycle which may be used to operate the brake, for example positioned on the right side of the handlebar, of to operate the clutch, positioned on the left side of the handlebar.

The actuation device 4 is provided with a device body 8 and an actuation element 24, such as for example, an actuation lever 26, constrained to said device body 8.

Such actuation may be of the mechanical and/or hydraulic type. For example, the mechanical type actuation provides for the connection of a cable or tie-rod to the actuation lever; said cable or tie-rod is in turn operatively connected to the part to be actuated, such as for example the clutch or brake.

The hydraulic type operation provides for use of at least one reservoir of liquid 12 which contains liquid to be fed to a pump 14.

The reservoir of liquid 12 may be made in one piece with the device body 8 or may be made separately from the device body 8 and associated thereto by means of hydraulic connections for the supply of the liquid.

The device body 8 comprises an attachment portion 16 suitable for permitting the attachment of the device 4 to the handlebar of an associable motor cycle and a support and guide portion 20 of an actuation element 24, such as for example an actuation lever 26. Preferably, the attachment portion 16 and the support and guide portion 20 are in one piece with the device body 8.

The device body 8 may be made from polymer material, for example such as Solvay "Ixef", Dupont "Zytel", EMS "Grivory".

The guide and support portion 20 typically comprises a fork-shaped portion 28 having a pair of prongs 32 opposite and separate from each other so as to rotatably house and guide the actuation lever 26.

The actuation lever 26 may be provided with a pusher element 34 suitable for interfacing with the pump 14 during the rotation movement of the actuation lever 26 operated manually by the user.

The attachment portion 16 comprises at least one attachment bracket 36, partially counter-shaped to an associable handlebar so as to present a housing seat 40 suitable for partially receiving the portion of handlebar used for the attachment of the device 4.

The attachment portion 16 comprises a locking bracket 44 attached to the attachment bracket 36 on the side opposite the associable handlebar, so as to identify a seat suitable for locking a portion of handlebar in the middle to block the actuation device 4.

Advantageously, the locking bracket 44 is at least partially made of metal, such as for example steel, aluminium, aluminium alloys. The locking bracket 44 may also comprise a metal core at least partially coated in polymer material.

The locking bracket 44 extends in a single piece from a first to a second end 48, 52, wherein the first end 48 is facing the attachment portion 16 and the second end 52 is facing the support and guide portion 20, so as to intercept and connect further to each other the attachment portion 16 and the support and guide portion 20.

Figure 2:
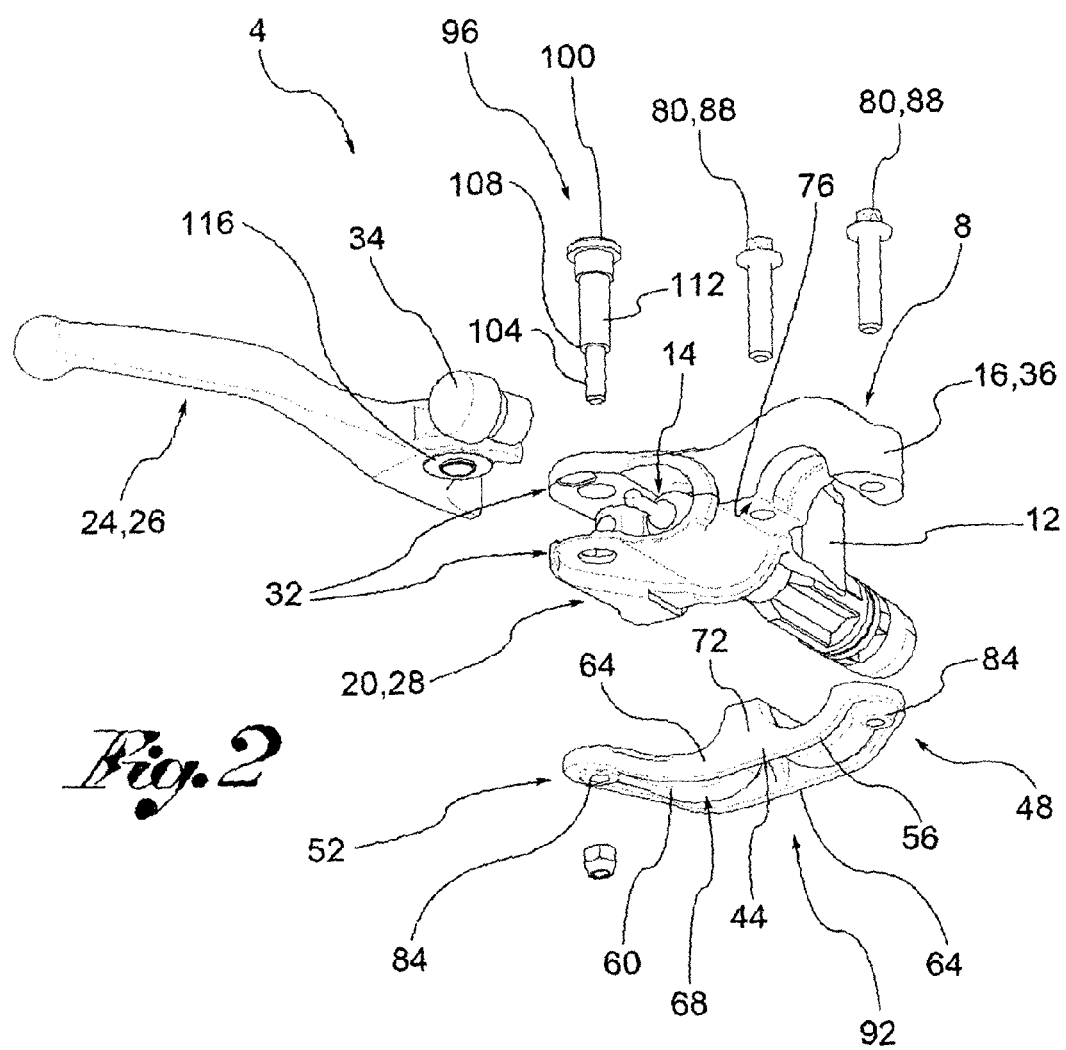
FIGS. 2-3 are perspective views in separate parts of the device in FIG. 1, from two different angles.
Figure 3:
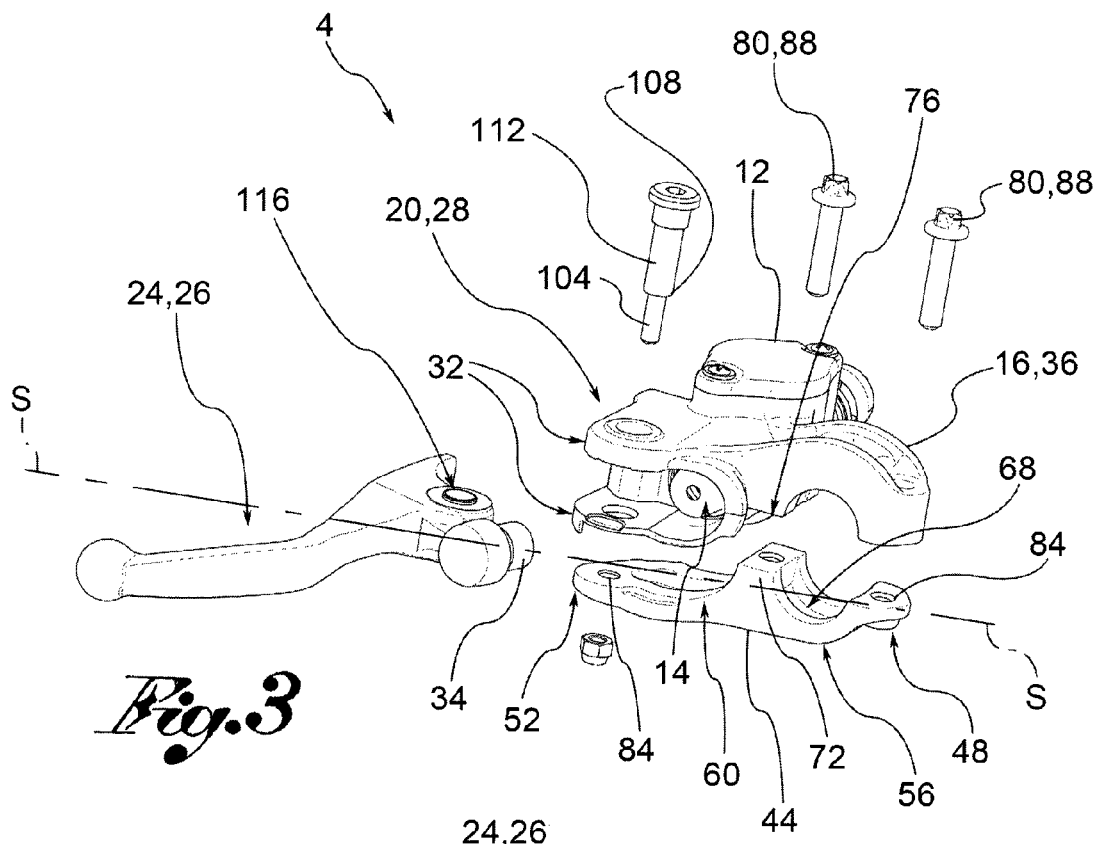

According to one embodiment, the locking bracket 44 is substantially rectilinear (FIGS. 1-3).

According to a further embodiment, the locking bracket 44 has a prismatic cross-section so as to enable it to be made by extrusion.

Figure 4:
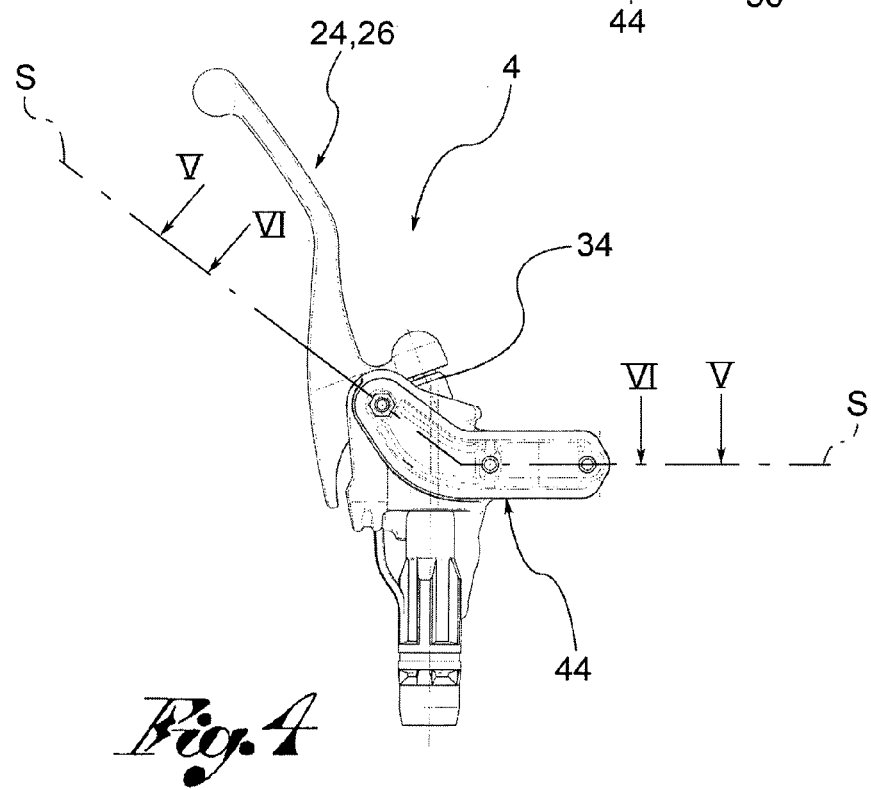
FIG. 4 shows a plan view, in an assembled configuration, of an actuation device according to a further embodiment of the present invention.
Figure 5:
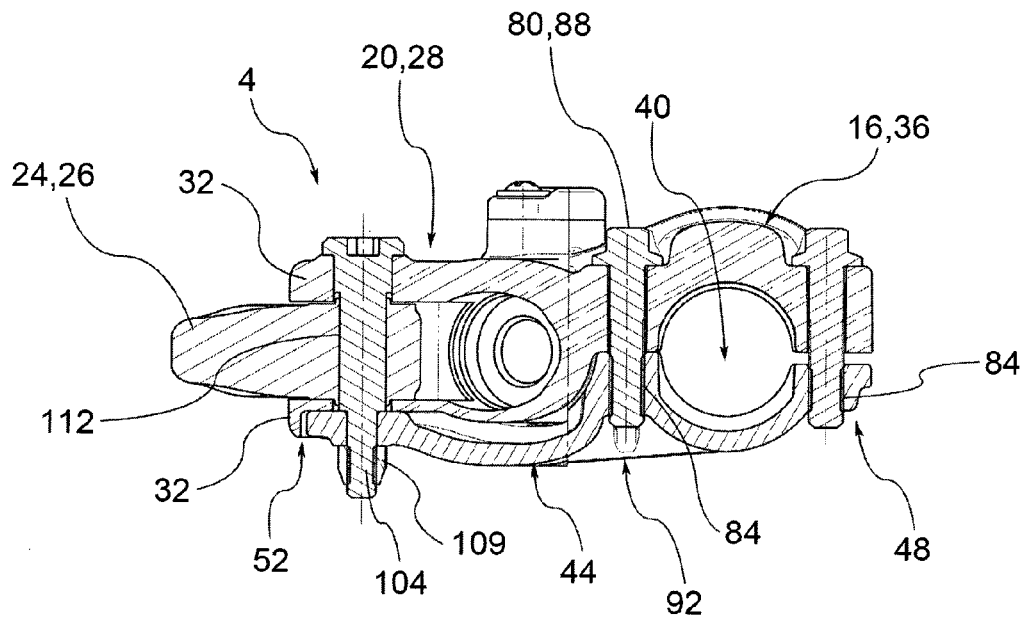
FIG. 5 shows a cross-section view of the device in FIG. 4, along the cross-section plane V-V in FIG. 4.
Figure 6A:
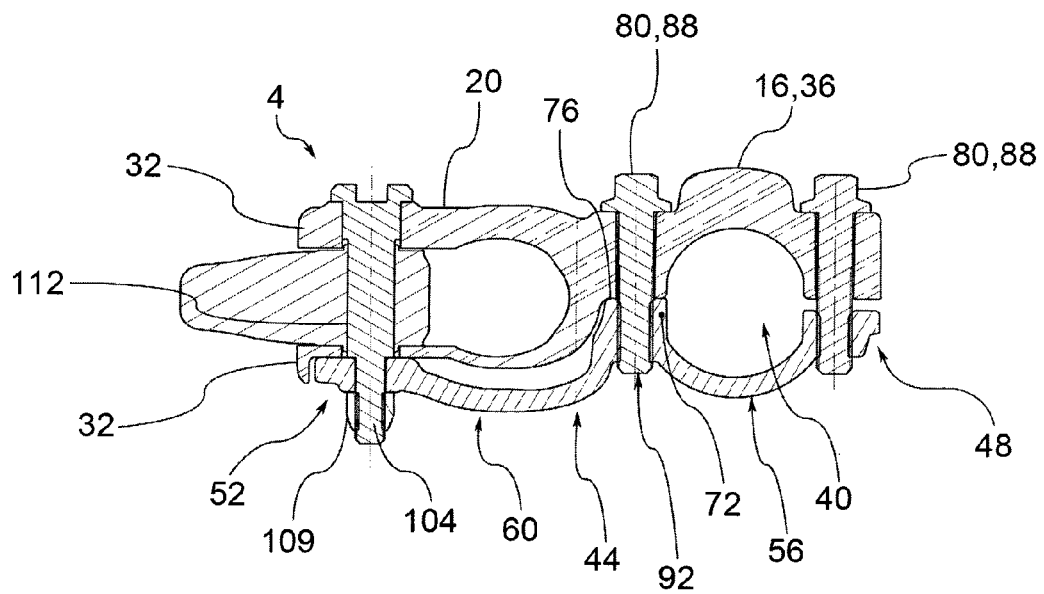
FIG. 6*a* shows a cross-section view of the device in FIG. 4, along the cross-section plane VI-VI in FIG. 4.
Figure 6C:
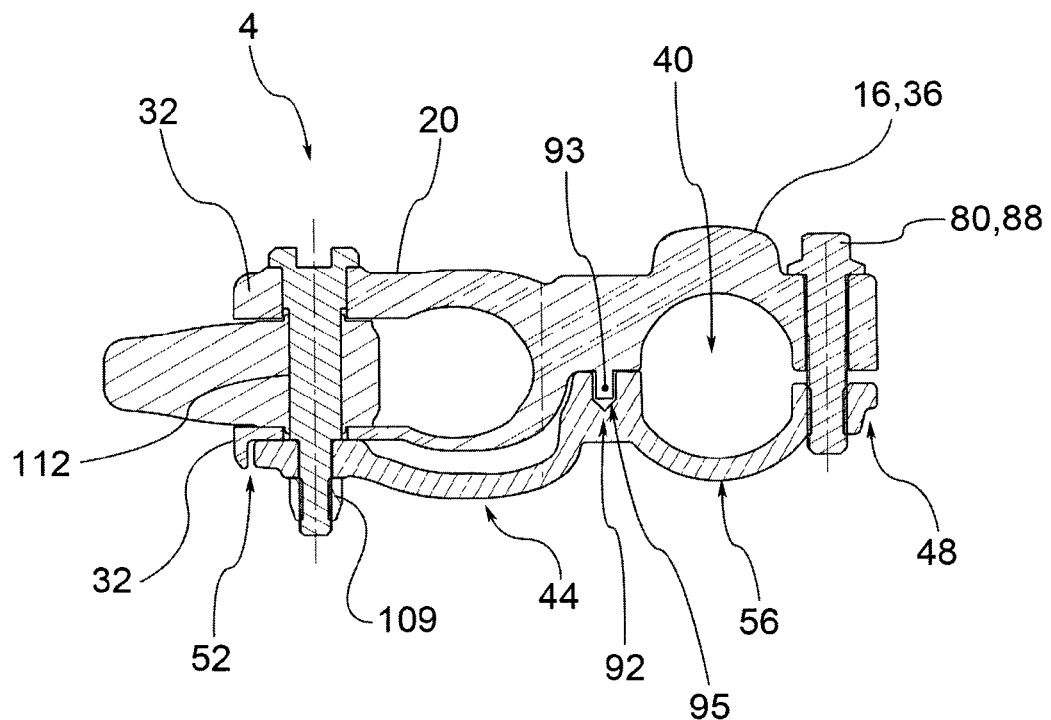

According to a further embodiment, the locking bracket 44 is a curved shape which identifies two branches angled to each other (FIGS. 4-6).

According to one embodiment, the locking bracket 44 has an overall double cradle configuration comprising a first cradle 56 having a semi-circular shape to house the handlebar at least partially and a second cradle 60 suitable for interfacing with said support and guide portion 20, wherein the first cradle 56 is adjacent to the first end 48 and the second cradle 60 is adjacent to the second end 52.

Preferably, at least one of said cradles 56, 60 comprises longitudinal reinforcement ribs 64, directed parallel to a main extension direction S-S of the locking bracket 44.

For example, the reinforcement ribs 64 are separated from each other by windows or hollows 68 passing through the locking bracket 44.

The cradles 56, 60 are adjacent to each other so as to identify a stop portion 72, intermediate between the first and second end 48, 52, positioned in abutment against a corresponding flattening 76 made on the device body 8, between the support and guide portion 20 and the attachment portion 16.

Preferably, the locking bracket 44 is attached to the attachment portion 16 and to the guide and support portion 20 by means of the insertion of threaded connection means 80.

The threaded connection means 80 are screwed inside threaded seats 84 made in the locking bracket 44.

For example, the threaded connection means 80 comprise at least two attachment pins or screws 88 respectively inserted at the first end 48 of the locking bracket 44 and at an intermediate portion 92 of the locking bracket 44, between the first and second end 48, 52.

According to a possible embodiment (FIG. 6*b*), the stop portion 72 is positioned at the first end 48, in abutment against a flattening 76 made on the device body 8, at the attachment portion 16.

According to a further possible embodiment (FIG. 6*c*), at said intermediate portion 92 of the locking bracket 64, a shaped coupling means 93 is provided, comprising for example a peg engaged in a relative seat 95. For example, the peg 93 may be made on the attachment bracket 36 and the seat 95 on the intermediate portion 92 of the locking bracket 64 or vice versa, that is to say the peg 93 is joined to the intermediate portion 92 of the locking bracket 64 and the seat 95 is made on the attachment bracket 36.

Preferably, the threaded connection means 80 comprise a guide pin 96 which connects the guide and support portion 20, the actuation element 24 and the second end 52 of the locking bracket 44 to each other.

According to one embodiment, said guide pin 96, on the side opposite a tightening head 100, comprises a threaded portion 104 screwed into a seat made in the second end 52 of the locking bracket 44, wherein the threaded portion 104 is delimited by a shoulder 108. The shoulder 108 constitutes a stop to the screwing of the guide pin 96, so as to always permit easy rotation of the actuation element 24.

According to a further embodiment, the threaded portion 104 passes through a non-threaded seat made in the second end 52 of the locking bracket 44: a nut 109 is screwed onto the threaded portion 104 so as to abut against the second end 52 and constrain the locking bracket 44 to the guide pin 96.

Preferably, the guide pin 96, between the threaded portion 104 and the tightening head 100, comprises a cylindrical collar 112 which receives and guides an eyelet 116 of the actuation lever 26.

Preferably, at its second end 52, the locking bracket 44 at least partially overlaps one of said prongs 32 of the fork-shaped portion 28 so as to increase the overall thickness thereof. Such overlapping constitutes the main stiffening of the support and guide portion 20, especially in the case of a fall.

Figure 7:
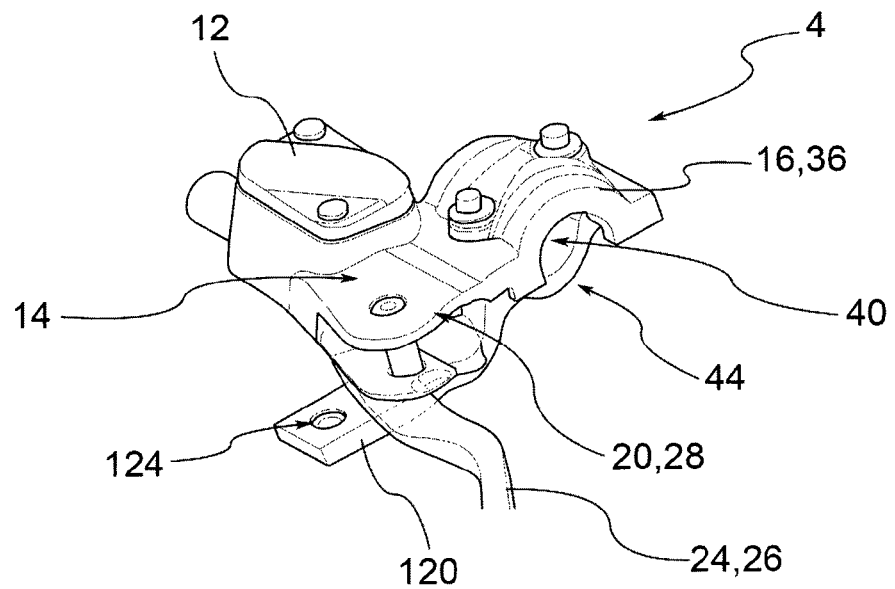
FIG. 7 shows a perspective view of a further embodiment of the device according to the present invention.

According to a possible embodiment (FIG. 7), the locking bracket 44 comprises an appendix 120 for the attachment of accessories, said appendix 120 overhanging the first end 48 and being fitted with relative attachment means for said accessories.

The attachment means may even be mere attachment holes. The accessories may comprise, for example, a rear-view mirror, a hand-shield and the like.

As may be appreciated from the description, the actuation device according to the invention makes it possible to overcome the drawbacks of the prior art.

In particular, the device has properties of resistance, rigidity and resilience equal to those of the devices of the prior art made of metal.

Moreover, the device according to the invention is particularly lightweight and economical to make in that it uses polymer materials, light in weight and economical.

The device according to the invention is compact in its dimensions and does not imply aesthetic alterations compared to the solutions of the prior art.

Moreover, the locking bracket guarantees extreme rigidity and resistance even in the case of the motor cycle falling over.

In particular, the connection which the locking bracket makes between the attachment portion and the support and guide portion helps to distribute the forces and stresses received, all over the device body thereby increasing the mechanical resistance of the device in the case of a fall.

A person skilled in the art may make numerous modifications and variations to the devices described above so as to satisfy contingent and specific requirements while remaining within the sphere of protection of the invention as defined by the following claims.

The invention claimed is:

1. An actuation device for brakes or clutches for motorcycles, provided with a device body, the actuation device comprising:
   an attachment portion suitable for permitting attachment of the actuation device to a handlebar of an associable motorcycle, a support and guide portion of an actuation element of the actuation device,
   wherein the attachment portion comprises at least one attachment bracket presenting a housing seat suitable for partially receiving a portion of the handlebar used for the attachment of the actuation device,
   the attachment portion comprises a locking bracket attached to the attachment bracket on the handlebar, so that the actuation device is locked into position via the connection of the locking bracket and the at least one attachment bracket,
   wherein
   the locking bracket is at least partially made of metal and extends in a single piece from a first to a second end, the first end facing the attachment portion and the second end facing the support and guide portion, so as to connect the attachment portion and the support and guide portion, wherein the locking bracket has a double cradle configuration comprising a first cradle having a semi-circular shape to house the handlebar at least partially and a second cradle suitable for interfacing with said support and guide portion, the first cradle being adjacent to the first end and the second cradle being adjacent to the second end, wherein said cradles are adjacent to each other so as to identify a stop portion, intermediate between the first and second end, positioned in abutment against a corresponding flattening made on the device body, between the support and guide portion and the attachment portion.

2. The actuation device according to claim 1, wherein the device body is formed of a polymer material.

3. The actuation device according to claim 1, wherein the actuation device is a mechanical type actuation device wherein the actuation element is operatively connected to the actuation device to be actuated, either the brake or the clutch, by means of a cable, tie-rod and/or a transmission.

4. The actuation device according to claim 1, wherein the actuation device is a hydraulic type actuation device comprising at least one reservoir of liquid to feed a pump, wherein said pump is operatively connected to the device to be actuated.

5. The actuation device according to claim 4, wherein the device body is in one piece with the reservoir of liquid.

6. The actuation device according to claim 1, wherein the guide and support portion comprises a pair of prongs opposite and separate from each other so as to rotatably house and guide the actuation lever and wherein, the locking bracket, at its second end at least partially overlaps one of said prongs so as to increase the overall thickness thereof.

7. The actuation device according to claim 1, wherein the locking bracket comprises an appendix for the attachment of accessories, said appendix overhanging the first end and being fitted with relative attachment means for said accessories.

8. The actuation device according to claim 1, wherein the locking bracket is substantially rectilinear.

9. The actuation device according to claim 1, wherein the locking bracket is a curved shape with two branches angled to each other.

10. The actuation device according to claim 1, wherein the locking bracket comprises a metal core.

11. An actuation device for brakes or clutches for motorcycles, provided with a device body, the actuation device comprising:
    an attachment portion suitable for permitting attachment of the actuation device to a handlebar of an associable motorcycle, a support and guide portion of an actuation element of the actuation device,
    wherein the attachment portion comprises at least one attachment bracket presenting a housing seat suitable for partially receiving a portion of the handlebar used for the attachment of the actuation device,
    the attachment portion comprises a locking bracket attached to the attachment bracket on a side opposite the handlebar, so that the actuation device is locked into position via the connection of the locking bracket and the at least one attachment bracket,
    wherein
    the locking bracket is at least partially made of metal and extends in a single piece from a first to a second end, the first end facing the attachment portion and the second end facing the support and guide portion, so as to connect the attachment portion and the support and guide portion wherein the locking bracket is attached to the attachment portion and to the guide and support portion by means of the insertion of threaded connection means, and
    wherein the threaded connection means comprise an attachment pin or screw inserted at the first end of the locking bracket and, at an intermediate portion of the locking bracket, a coupling means is provided, comprising a peg, made on the attachment bracket and engaged in a relative seat made on the intermediate portion of the locking bracket or vice versa.

12. The actuation device according to claim 11, wherein the locking bracket has an overall double cradle configuration comprising a first cradle having a semi-circular shape to house the handlebar at least partially and a second cradle suitable for interfacing with said support and guide portion, the first cradle being adjacent to the first end and the second cradle being adjacent to the second end.

13. The actuation device according to claim 12, wherein at least one of said cradles comprises longitudinal reinforcement ribs directed parallel to the locking bracket.

14. The actuation device according to claim 13, wherein said reinforcement ribs are separated from each other by windows or hollows passing through the locking bracket.

15. The actuation device according to claim 12, wherein said cradles are adjacent to each other so as to identify a stop portion, intermediate between the first and second end, positioned in abutment against a corresponding flattening made on the device body, between the support and guide portion and the attachment portion.

16. The actuation device according to claim 11, wherein said threaded connection means are screwed inside threaded seats made in the locking bracket.

17. The actuation device according to claim 11, wherein the threaded connection means comprise at least two attachment pins or screws respectively inserted at the first end of the locking bracket and at an intermediate portion of the locking bracket, between the first and second end.

18. The actuation device according to claim 11, wherein the threaded connection means comprises a guide pin which connects the guide and support portion, the actuation element of a pump and the second end of the locking bracket to each other.

19. The actuation device according to claim 18, wherein said guide pin, on a side opposite a tightening head, comprises a threaded portion screwed into a seat made in the second end of the locking bracket, the threaded portion being delimited by a shoulder.

20. The actuation device according to claim 19, wherein said guide pin, on a side opposite a tightening head, comprises a threaded portion passing through a seat made in the second end of the locking bracket, and a nut being provided screwed onto the threaded portion so as to abut against the second end and constrain the locking bracket to the guide pin.

21. The actuation device according to claim 18, wherein the guide pin, between the threaded portion and the tightening head, comprises a cylindrical collar which receives and guides an eyelet of the actuation lever.

* * * * *